United States Patent
Goker et al.

(10) Patent No.: US 7,190,544 B2
(45) Date of Patent: Mar. 13, 2007

(54) SYSTEM AND METHOD FOR TAPE DRIVE UNDER RUN CONTROL

(75) Inventors: Turguy Goker, Solana Beach, CA (US); Kempton W. Redhead, Fountain Valley, CA (US)

(73) Assignee: Certance LLC, Costa Mesa, CA (US)

( * ) Notice: Subject to any disclaimer, the term of this patent is extended or adjusted under 35 U.S.C. 154(b) by 171 days.

(21) Appl. No.: 10/985,624

(22) Filed: Nov. 10, 2004

(65) Prior Publication Data

US 2006/0098324 A1    May 11, 2006

(51) Int. Cl.
*G11B 15/46* (2006.01)

(52) U.S. Cl. .................. 360/73.07; 360/73.08

(58) Field of Classification Search .............. None
See application file for complete search history.

(56) References Cited

U.S. PATENT DOCUMENTS

| | | | |
|---|---|---|---|
| 2,351,410 A | 6/1944 | Di Ianni | |
| 4,338,640 A | 7/1982 | Yabu et al. | |
| 5,210,829 A * | 5/1993 | Bitner | 710/57 |
| 5,303,095 A | 4/1994 | Vuong | |
| 5,426,537 A | 6/1995 | Yeh et al. | |
| 5,742,444 A * | 4/1998 | Ozue | 360/60 |
| 5,953,177 A | 9/1999 | Hughes | |
| 6,118,605 A | 9/2000 | Call et al. | |
| 6,775,086 B1 | 8/2004 | Kobayashi et al. | |
| 6,785,076 B1 | 8/2004 | Alva | |
| 6,958,878 B2 * | 10/2005 | Jaquette et al. | 360/73.04 |
| 2002/0030918 A1 * | 3/2002 | Beavers et al. | 360/73.08 |
| 2004/0179284 A1 * | 9/2004 | Martin | 360/8 |
| 2006/0098323 A1 * | 5/2006 | Goker et al. | 360/73.07 |

FOREIGN PATENT DOCUMENTS

| | | |
|---|---|---|
| EP | 0268 745 A2 | 6/1988 |
| EP | 0468 112 A1 | 1/1992 |
| GB | 2079516 A | 1/1982 |
| JP | 59 028260 A | 2/1984 |

* cited by examiner

Primary Examiner—Andrea Wellington
Assistant Examiner—Varsha A. Kapadia
(74) Attorney, Agent, or Firm—Mark J. Spolyar (57) ABSTRACT

A control system and method for operating a system comprising a host computer, a buffer, a tape drive and a tape is provided. The method includes writing data to the tape while the tape is traveling at a first speed; stopping the tape; determining a minimum distance to reposition the tape; and, thereafter repositioning the tape.

26 Claims, 6 Drawing Sheets

Table I

| Parameters | Units | Values |
|---|---|---|
| Data set size defined by the format | Mbytes | 0.403 |
| Maximum buffer size defined by the DRAM size | Mbytes | 42 |
| Initial buffer level to start tape motion | Number of data sets | 10 |
| Maximum tape speed defined by format | Meters/s | 5.916 |
| Maximum tape speed defined by the drive | Meters/s | 1.5 |
| Maximum transfer rate defied by the format | Mb/s | 34 |
| Maximum reel servo acceleration defined by the drive motor and servo optimization | Meters/s$^2$ | 5.0 |
| Reel servo jerk defined by the drive motor and servo optimization | Meters/s$^3$ | 10.0 |
| RTOS servo time delay, defined by the servo system response | Sec | 0.020 |

Fig. 4

Table II – Back Up Time

| Host Rate / $V_t$ | 13 | 15 | 17 | 20 | 22 | 24 | 26 | 28 | 30 | 32 | 34 |
|---|---|---|---|---|---|---|---|---|---|---|---|
| 2.077 | *249 | 249 | 249 | 249 | 249 | 249 | 249 | 249 | 249 | 249 | 249 |
| 2.5 | 250 | *225.8 | *225.8 | 225.8 | 225.8 | 225.8 | 225.8 | 225.8 | 225.8 | 225.8 | 225.8 |
| 3 | 251.3 | 224.2 | 197.2 | 187.1 | 187.1 | 187.1 | 187.1 | 187.1 | 187.1 | 187.1 | 187.1 |
| 3.5 | 260.8 | 234.7 | 208.6 | *163.9 | 163.9 | 163.9 | 163.9 | 163.9 | 163.9 | 163.9 | 163.9 |
| 4 | 275.3 | 246.6 | 222.1 | 177.1 | *148.5 | 148.5 | 148.5 | 148.5 | 148.5 | 148.5 | 148.5 |
| 4.5 | 290.1 | 262.9 | 240.4 | 195.7 | 168.9 | 151 | *133.1 | 133.1 | 133.1 | 133.1 | 133.1 |
| 5.1 | 316.4 | 291.5 | 266.5 | 221.7 | 196.9 | 177.1 | 162.3 | *117.1 | 117.1 | 117.1 | 117.1 |
| 5.5 | 332.7 | 306.2 | 284.9 | 242.2 | 215.8 | 194.6 | 178.8 | 136.5 | 148.5 | 148.5 | 148.5 |
| 5.916 | 351.7 | 329 | 306.2 | 260.9 | 232.6 | 215.4 | 198.4 | 158.9 | *130.6 | *130.6 | *102.4 |
| ideal speed | 2.3 | 2.6 | 3 | 3.5 | 3.8 | 4.2 | 4.5 | 4.9 | 5.2 | 5.6 | 5.9 |
| Ideal time | 240.4 | 208.3 | 183.8 | 156.2 | 142 | 130.2 | 120.2 | 111.6 | 104.2 | 97.7 | 91.9 |
| Error | -8.62 | -17.47 | -41.98 | -7.66 | -6.46 | -18.3 | -12.91 | -6.1 | -26.44 | -32.95 | -10.49 |
| % error | -3.59 | -8.39 | -22.84 | -4.9 | -4.55 | -14.05 | -10.74 | -5.46 | -25.38 | -33.74 | -11.41 |

Fig. 5

Table III – Repo to Repo Time

| Host Rate / $V_t$ | 13 | 15 | 17 | 20 | 22 | 24 | 26 | 28 | 30 | 32 | 34 |
|---|---|---|---|---|---|---|---|---|---|---|---|
| 2.077 | na | na | na | na | na | na | na | na | na | na | na |
| 2.5 | 29.26 | na | na | na | na | na | na | na | na | na | na |
| 3 | 9.93 | 17.23 | 61.82 | na | na | na | na | na | na | na | na |
| 3.5 | 6.32 | 8.65 | 13.53 | 20.48 | na | na | na | na | na | na | na |
| 4 | 4.863 | 6.1 | 8.2 | 9.18 | 16.68 | 31.33 | na | na | na | na | na |
| 4.5 | 3.75 | 4.49 | 5.52 | 5.44 | 7.38 | 9.27 | 13.15 | na | na | na | na |
| 5.1 | 2.94 | 3.36 | 3.9 | 4.35 | 5.5 | 6.48 | 8.18 | 21.52 | na | na | na |
| 5.5 | 2.6 | 2.9 | 3.33 | 3.55 | 4.29 | 4.86 | 5.7 | 10 | 18.66 | na | na |
| 5.916 | 2.287 | 2.55 | 2.845 | 3.55 | 4.29 | 4.86 | 5.7 | 10 | 18.66 | 18.66 | na |

Fig. 6

Table IV - Number of Under Runs

| $V_t$ \ Host Rate | 13 | 15 | 17 | 20 | 22 | 24 | 26 | 28 | 30 | 32 | 34 |
|---|---|---|---|---|---|---|---|---|---|---|---|
| 2.077 | 0 | 0 | 0 | 0 | 0 | 0 | 0 | 0 | 0 | 0 | 0 |
| 2.5 | 8 | 0 | 0 | 0 | 0 | 0 | 0 | 0 | 0 | 0 | 0 |
| 3 | 19 | 11 | 3 | 0 | 0 | 0 | 0 | 0 | 0 | 0 | 0 |
| 3.5 | 26 | 19 | 12 | 7 | 8 | 4 | 0 | 0 | 0 | 0 | 0 |
| 4 | 31 | 24 | 18 | 14 | 16 | 12 | 9 | 0 | 0 | 0 | 0 |
| 4.5 | 35 | 29 | 24 | 21 | 20 | 16 | 13 | 5 | 0 | 0 | 0 |
| 5.1 | 40 | 35 | 30 | 25 | 23 | 20 | 17 | 10 | 5 | 5 | 0 |
| 5.5 | 42 | 37 | 33 | 28 | | | | | | | |
| 5.916 | 44 | 40 | 36 | | | | | | | | |

Fig. 7

Graph I

SYSTEM AND METHOD FOR TAPE DRIVE UNDER RUN CONTROL

FIELD OF THE INVENTION

The present invention relates to tape drives. More particularly, the present invention relates to control of the reposition and under run processes in tape drives.

BACKGROUND OF THE INVENTION

High-density recording on multiple tracks of a magnetic tape is known. In certain arrangements, parallel tracks extend along a longitudinal direction of the magnetic tape. The magnetic tape is moved transversely across a read/write head and data is recorded or read.

Many conventional tape drives are used to back up data stored on the hard disc drive of a computer system. Generally the speed at which the hard disc system can deliver data differs from the speed at which the tape drive can record data and in such cases a data buffer is used. The data is read from the hard disc drive and stored on the data buffer and then the data is transmitted from the data buffer to be recorded on the tape drive.

When a data buffer is used, repositions and under runs of the tape drive are important parts of the operation. They are invoked by the tape drive when the data buffer becomes empty so there is no more data to be written to the tape. At this time the tape is moving at a certain speed and must slow down and stop. Then the tape direction is reversed to cause the tape to go back some distance so that the writing location precedes the location where writing of data was stopped. The tape then is ready speed up in the forward direction and rewriting can be started from the last place it ended. This can be called the append process.

The reposition operation is the motion that begins at the time when the drive is slowed down to stop and the tape moves backward to reposition the magnetic head ahead of a particular position on the tape such as the last place the data was written. The time it takes from the point of start of ramp down to final rest position is defined as the reposition time. The under run operation is a combination of two physical motions, reposition followed by a ramp up motion to restart the writing process.

Commonly in conventional drive design, the reposition and under run operations are done by speed control and moving the tape back far enough during reposition so that if the drive was commanded to rewrite it has plenty distance to move during ramp up part of the process such that it is ready in both speed and tracking to Append to the data. However, in conventional drive design the under run operation is not optimized.

Figure 1:
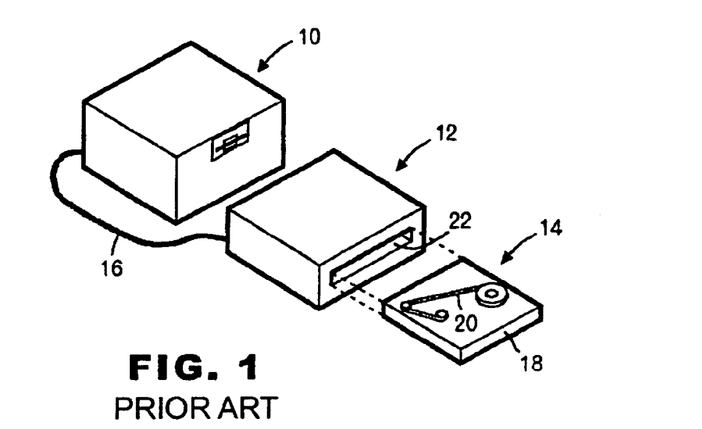
FIG. 1 is a view of a conventional tape drive system.

A conventional tape drive system is shown in FIG. 1. This system comprises a tape drive 12 connected to a host computer 10 by a cable 16, and an associated tape cartridge 14. The tape drive 12 includes a receiving slot 22 into which the tape cartridge 14 is inserted. The tape cartridge 14 comprises a housing 18 containing a length of magnetic tape 20. The tape drive 12 is preferably compatible with the associated host computer, and can assume any one of a variety of cartridge or cassette linear formats.

Figure 2:
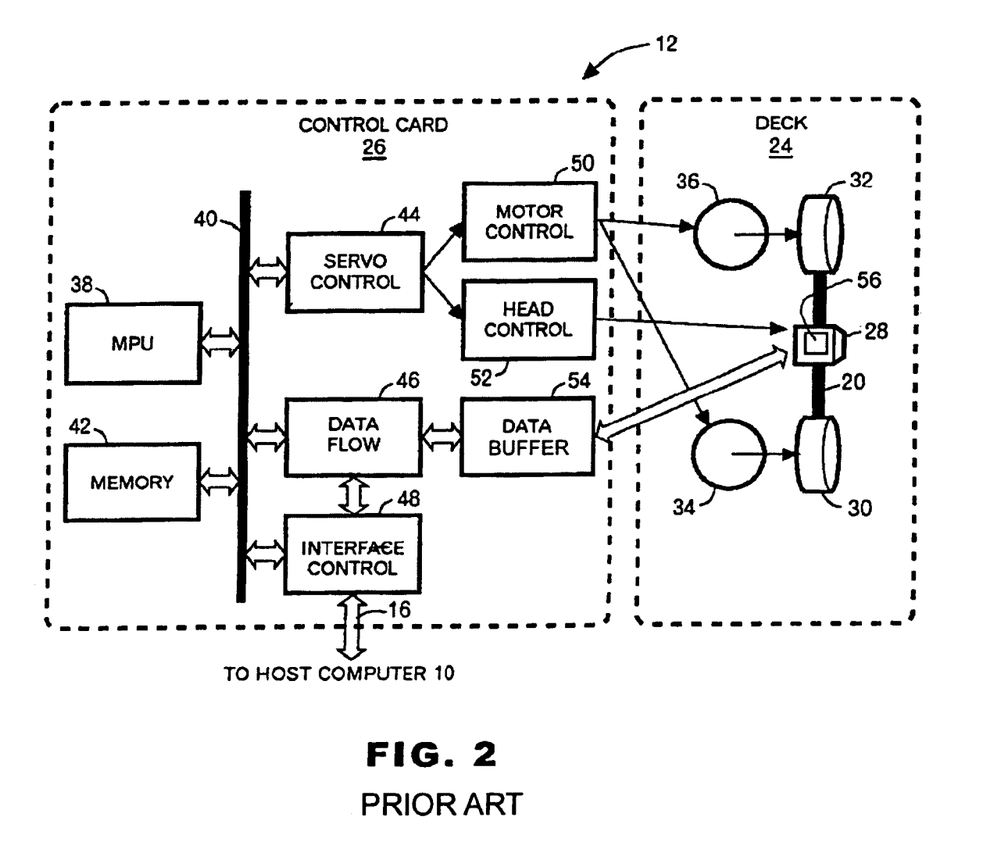
FIG. 2 is a block diagram showing an exemplary arrangement of a control card and tape drive according to the prior art.

A typical configuration of the tape drive 12 is schematically shown in FIG. 2. The tape drive 12 in FIG. 2 comprises a deck 24 including movable parts, and a control card 26 including various circuits and buses. The deck 24 includes a head assembly 28 which contacts the tape 20 of the tape cartridge inserted into the tape drive 12 to read and write data and read a servo pattern, and motors 34 and 36 for respectively rotating a supply reel 30 and a take-up reel 32. For a tape cartridge 14 of a dual reel type, both of the reels 30 and 32 are included in the tape cartridge 14. For a tape cartridge 14 of a single reel type, however, only the supply reel 30 is included in the tape cartridge 14 while the take-up reel 32 is provided in the tape drive 12. Although not shown in FIG. 2, the deck 24 additionally includes a mechanism for moving the head assembly 28 across the width of the tape 20, a mechanism for holding the inserted tape cartridge, and a mechanism for ejecting the inserted tape cartridge.

The control card 26 includes a microprocessor (MPU) 38 for the overall control of the tape drive 12; a memory 42, a servo control unit 44, a data flow unit 46 and an interface control unit 48 all of which are connected to the MPU 38 via an internal bus 40; a motor control unit 50 and a head control unit 52 which are connected to the servo control unit 44, and a data buffer 54 which is connected to the data flow unit 46. While the memory 42 is shown as a single hardware component in FIG. 2, it is actually preferably constituted by a read only memory (ROM) storing a program to be executed by the MPU 38, and a working random access memory (RAM). The servo control unit 44 manages speed control for the motors 34 and 36 and position control for the head assembly 28 by transmitting the respective control signals to the motor control unit 50 and the head control unit 52. The motor and head control units 50 and 52 respond to these control signals by physically driving the motors 34, 36 and positioning the head assembly 28, respectively.

The head assembly 28 includes servo heads which read data from servo tracks or bands on the tape 20. Control card 26 utilizes data from the servo tracks to generate a position error signal (PES), and the PES is used by the servo control unit 44 to cause the head control unit 52 to position the head assembly 28. In some conventional designs the head assembly 28 includes a voice coil motor (VCM) 56 which receives electrical signals from the head control unit 52 and positions the head assembly 28 according to the received signals.

The data flow unit 46 compresses data to be written on the tape 20, decompresses data read from the tape 20 and corrects errors, and is connected not only to the data buffer 54 but also to the interface control unit 48. The interface control unit 48 is provided to communicate data to/from the host computer 10 via the cable 16. The data channel unit 54 is essentially a data modulating and demodulating circuit. That is, when data is written to the tape 20, it performs digital-analog conversion and modulation for data received from the data flow unit 46, and when data is read from the tape 20, it performs analog-digital conversion and demodulation for data read by the head assembly 28.

Commonly in conventional drive design, the reposition distance is not minimized. Accordingly, it is an object of the present invention to provide a system and method to minimize the reposition distance.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 5 is a table showing back up times.

FIG. 6 is a table showing repositioning times.

DETAILED DESCRIPTION

Embodiments of the present invention are described herein in the context of a system and method for tape drive control. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components and process steps may be implemented using various types of operating systems, computing platforms, computer programs, and/or general purpose machines. For example, the calculations and algorithms described below could be carried out in an MPU such as the MPU 38 shown in FIG. 2. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 3:
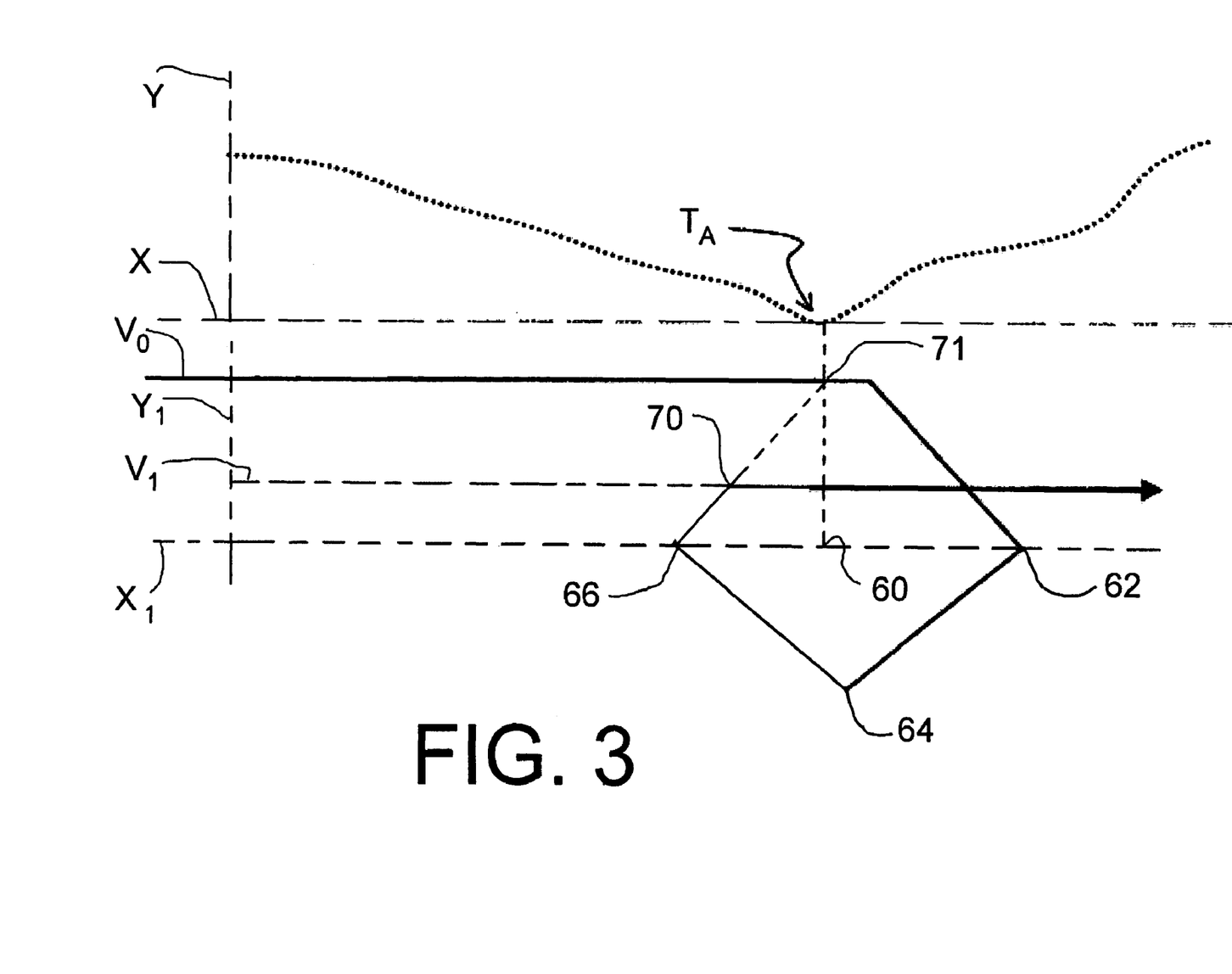
FIG. 3 schematically illustrates the under run and reposition operations.

FIG. 3 schematically illustrates the under run and reposition operations. The upper part of FIG. 3 shows the relative quantity of data in the data buffer 54 (on the vertical axis Y) as a function of time (on the horizontal axis X.) The lower part of FIG. 3 illustrates the speed of the tape (on the vertical axis $Y_1$) as a function of the position on the tape (on the horizontal axis $X_1$). Beginning at the left of the Figure it can be seen that there is data in the data buffer 54, the tape is traveling forward at a speed $V_0$, and the tape drive is writing data from the buffer 54 to the tape 20. Then when the data buffer 54 becomes empty, the time is $T_A$, and the tape is at the append position 60. At this time the data flow unit 46 instructs the servo control 44 and motor control unit 50 to slow the tape down and stop the tape at stop point 62. The motor control unit 50 then commences the reposition operation which causes the tape to travel in the reverse direction until the tape reaches maximum reverse speed at point 64 and then slows down to stop as indicated at reposition point 66. The motor control unit 50 keeps the tape stopped until the buffer contains sufficient data, at which time the servo control unit 44 instructs the motor control unit to accelerate the tape in the forward direction until the tape reaches the next tape speed $V_1$ as indicated at ramp-up end point 70. When the tape then reaches the append position 60, or at some predetermined distance thereafter, data is again written to the tape from the buffer 54.

It should be understood that the next tape speed $V_1$ can be the same as the prior speed $V_0$ or different from the prior tape speed $V_0$. In some applications it is desirable to always use the same tape speed, in which case $V_1$ is always equal to $V_0$. However, we have developed a system and method to optimize the tape speed, in which case $V_1$ is not necessarily the same as $V_0$. With reference to FIG. 3, if $V_1$ is less than $V_0$, then ramp-up end point 70 is lower than $V_0$ and ramp-up end point 70 precedes the append position 60. On the other hand, if $V_1$ is equal to $V_0$, then ramp-up continues from point 66, through point 70 and up to end point 71, as indicated by the dashed line 72, and writing begins at the append point 60.

Simulation

We have developed a computer simulation of a tape drive and computer system using the Matlab-Simulink modeling tool. It should be understood that others could use other tools such as C programming to accomplish comparable simulations. Also, it should be understood that comparable data and tables could be determined based on experiments with computers and tape drives.

Figure 4:
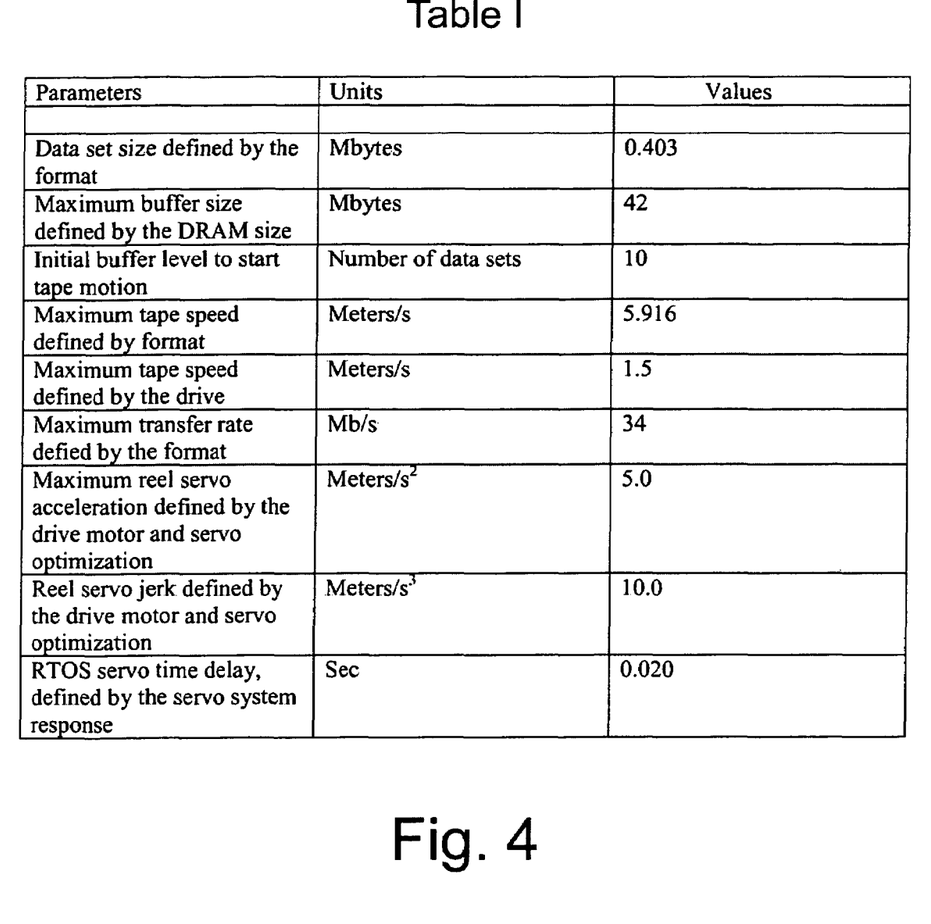
FIG. 4 is a table showing example parameters for a tape drive system.
Figure 7:
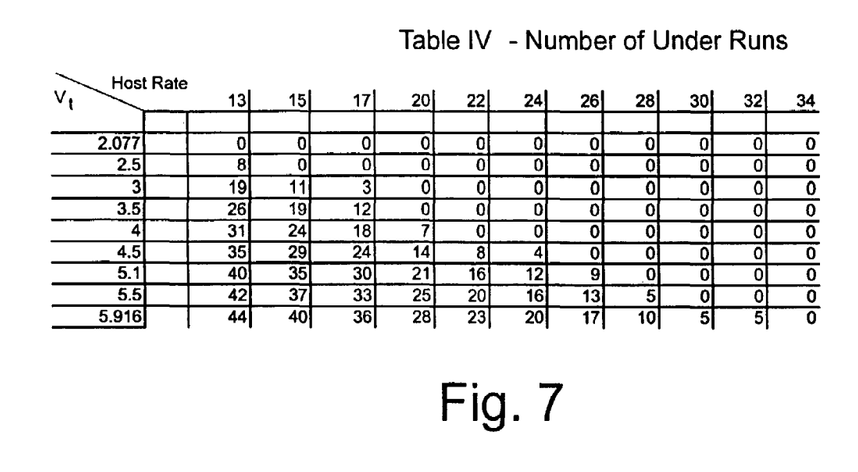
FIG. 7 is a table showing number of under runs.

We ran our simulation under a variety of conditions to develop data to compile tables for a variety of host and tape drive systems. As one example we used the parameters shown in Table I (FIG. 4) in a set of simulations to compile the data shown in shown in FIGS. 4–6 (Tables II, III and IV, respectively). The "Values" shown in the right most column of Table I are typical for many computer systems and tape drives.

The following definitions apply to terms used in Tables I–IV:

Repo-to-Repo Time: This is the time that it takes to empty out a saturated buffer, i.e. the time between one reposition operation and the next succeeding reposition operation.

Total Write Time: This data tells us the total time that it took to write a predefined dataset number to the tape.

Number of Under Runs: The total number of under runs that the drive had to do during the writing of the tape.

The following explains Tables II, III and IV:

Table II shows the back up time, for a given host rate in Mb/sec and a tape speed, $V_t$, in m/sec, i.e. how long it takes to write a full wrap of data, in seconds. Full wrap is a run from bot to eot. Table III is the actual repo-to-repo time for each case. Table IV is the number of detected under runs for each case.

In Table II "ideal speed" is the ideal tape speed in m/sec—the speed that corresponds to the theoretical maximum transfer rate for a given host rate. For instance, for a host rate of 13 MB/s and Max Tape speed of 5.916 m/s and Max Transfer Rate of 34 MB/s, the ideal speed is 2.3 m/s (which is between $V_t$ of 2.077 and 2.5 shown in Table II.)

Ideal time is the time takes to run the full wrap at ideal speed.

Times indicated by an asterisk in Table II are determined with reference to Table IV. In Table IV certain times correspond to zero under runs, and those times are identified in Table II with an asterisk. For example, in Table IV for the host rate of 20 Mb/sec the corresponding speed Vt is 3.5 m/sec. Thus in Table II the time of 163.9, which corresponds to the speed of 3.5 m/sec, is shown with an asterisk.

Error is the delta time between the ideal time and the times indicated with an asterisk. For example, for a host rate of 20 Mb/sec, the time of 163.9 is indicated by an asterisk; the ideal time is 156.2 sec; and the error is −7.66 sec.

The following example can now be understood. For instance, when Host Rate is 13 MB/s and the drive is running at 3.5 m/s speed, we generate 26 under runs (Table IV) and 6.32 sec delta time between the under runs (Table III). This number of under runs will result in a total time for a full wrap of data of 260.8 sec. (Table II). Since the ideal time at this host rate is 240.4 sec (Table II) the system will suffer drastically causing a time delay of 20.4 seconds.

We have found that the optimum tape speed is a speed slightly higher than the ideal tape speed so that we can achieve 1 to 2 under runs over the full wrap and therefore we are able to detect host rate increases as well as run at nearly ideal speeds. In other words, it might appear to be desirable to run that tape at the ideal speed. However, if one were to do so then zero under runs would be achieved and we would not be able to account for increases in the Host Rate. This can be understood from the following example. Let us assume that the Host Rate is 20 MB/s and the drive running at 3.5 m/s; so that zero under runs occur, as indicated in Table IV. Now, if the Host rate increases to e.g. 30 Mb/sec, zero under runs will still occur, and the drive would continue to operate at 3.5 m/sec. Thus it can be seen that the Host-Drive system will not perform optimally since the Host will frequently fill the buffer which in turn requires that the Host stop filling the buffer until the drive is able to catch up. Frequently stopping and starting the Host results in a relatively slow overall system transfer rate.

Turning again to the example above, with Host Rate of 13 MB/s and the drive running at 3.5 m/s speed the optimum speed is of 2.3 m/s that will result of 1 to 2 under runs over the full wrap.

Graph I

Turning now to Graph I (FIG. 8) the graph shows Transfer Rate Error vs. Data Set Count. The Data Set Count is defined as the number of data sets that are written to the tape from the start of the tape to the beginning of the first under run. The Transfer Rate Error is defined as the difference between the drive Transfer rate and the Host Transfer Rate.

We created Graph I experimentally. However, similar graphs could be created using computer simulations.

Figure 8:
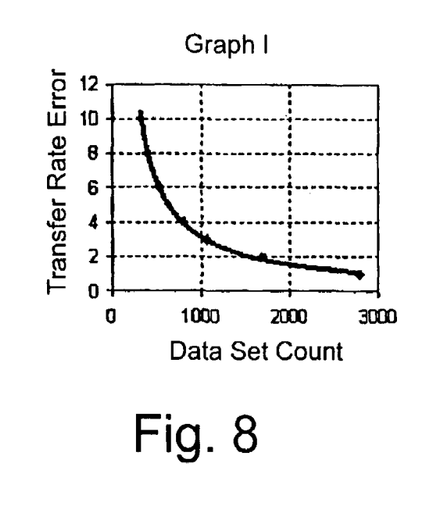
FIG. 8 is a graph showing rate error as a function of data set count.

Now, having Graph I we determine an equation describing the graph. In this particular case, the equation, Equation 1 in this example, is $Y=3780.6\ X^{-1.027}$ Actual Operation Having this information, we can now optimize the tape speed during operation of a tape drive—host computer system, as follows.

For example, assume that we have a tape drive and host system with the parameters given in Table I, and the tape has been traveling at the rate of 6 m/sec. and the drive has a transfer rate of 34 Mb/sec. Our system continuously monitors the number of data sets being written. When the buffer becomes empty a reposition operation is initiated, and the system determines the number of data sets which have been written since the immediately preceding under run. In this case let us assume that that number of data sets is 220. Now the system uses Equation 1 or Graph I to determine the Transfer Rate Error, which in this case is approximately 8 Mb/sec. Knowing this information the system estimates that the host transfer rate was 34 minus 8=26 Mb/sec. Then the system utilizes Tables II and IV. For the given host rate of 26 Mb/sec it can be seen that the ideal tape speed is about 4.5 m/sec since at that speed there would be zero under runs. Accordingly the system selects the next higher tape speed above 4.5 m/sec., if a discrete speed system is being used. In this example, the next higher tape speed is 5.1 m/sec as shown in Tables II and IV. However, if a variable speed drive system is in use, the system selects the appropriate higher speed to achieve one or two overruns, which in this example would be about 4.6 m/sec.

It should now be recognized that in order to minimize the time involved in the reposition and under run operations it is important to minimize the distance that the tape is repositioned, i.e. the distance between stop point 62 and reposition point 66. The following algorithms accomplish this minimization.

Initially the following relationship is established.

$$LPOS_{repo}=LPOS_{append}-\Delta LPOS_{rampupV1}$$

Where $LPOS_{repo}$=linear reposition point 66 on the tape.

$LPOS_{append}$=append position 60 on the tape.

$\Delta LPOS_{rampupV1}$=ramp-up distance which is the distance on the tape between linear reposition point 66 and the ramp-up end point, which may be e.g. point 70 or point 71.

Figure 9:
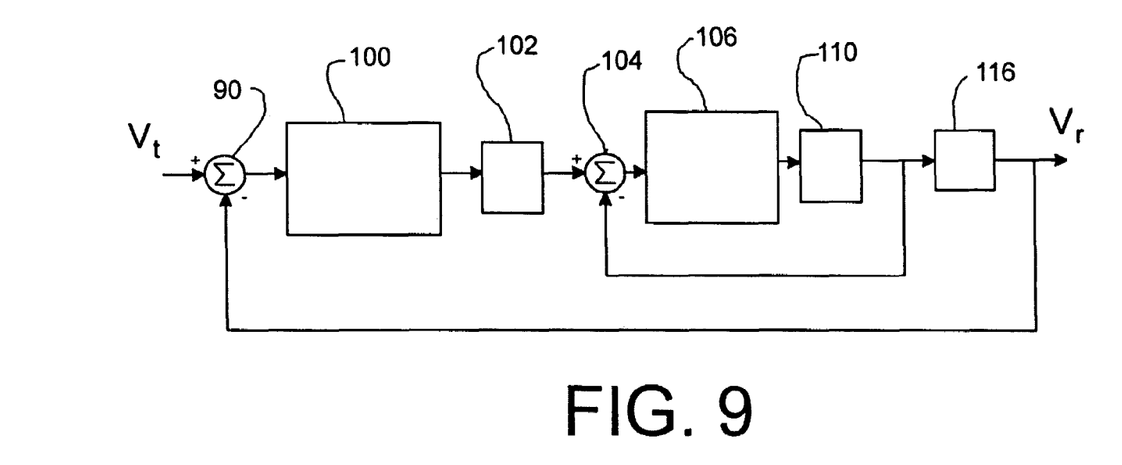
FIG. 9 is a block diagram illustrating a calculation according to an embodiment of the present invention.

As illustrated in FIG. 9, calculation of $\Delta LPOS_{rampupV1}$ is accomplished as follows. Once $\Delta LPOS_{rampupV1}$ is calculated then $LPOS_{repo}$ can be determined, since $LPOS_{append}$ is known.

Calculation of $\Delta LPOS_{rampupV1}$

The following variables are initialized:

Vr=0

Vr is called reference speed that changes each sample time calculation.

$V_t=V_1$ $V_t$ is target speed that is fixed for the ramping duration.

Acc=0

Ts=sample time constant $\Delta LPOS_{rampupV1}=0$ jrkmax=a predetermined value which is the maximum rate of change of the acceleration of the particular tape in a particular tape drive, which is determined experimentally or known for a particular class of drives. accmax=a predetermined value which is the maximum acceleration of the particular tape in a particular tape drive, which is determined experimentally or known for a particular class of drives.

Then the following calculations of steps 100–116 are repeated until err=zero, where err=$V_t$-Vr.

In Step 90 calculate err

Where $err=V_t-Vr$.

In step 100 calculate accref

Where $accref = 2\sqrt{2*|err|*jrkmax}$

Then in step 102 limit accref to a value between +accmax and −accmax.

Then in step 104 calculate temp

Where temp=accref-Acc

Then in step 106 set temp according to a deadband by
if temp>deadband
set temp1=Kp
else if temp<-deadband
set temp1=-Kp Then in step 110 integrate the variable temp1 to determine Acc:

Where $Acc_{n+1}$=temp1*Ts+$Acc_n$

Where $Acc_{n+1}$ refers to Acc determined in the n+1 iteration

Then in step 116 integrate the variable Acc to determine Vr:

$Vr_{n+1}$=Acc*Ts+$Vr_n$

Where $Vr_{n+1}$ refers to Vr determined in the n+1 iteration

Having determined Vr, the velocity reference variable that changes with each calculation, calculate $\Delta LPOS_{rampupV1}$ by integrating Vr between time 0 and the final calculation:

$\Delta LPOS_{rampupV1}$=$\Delta LPOS_{rampupV1}$+Vr*Ts

Having determined $\Delta LPOS_{rampupV1}$ and knowing $LPOS_{append}$ we utilize the equation identified above:

$LPOS_{repo}$=$LPOS_{append}$-$\Delta LPOS_{rampupV1}$

Now that $LPOS_{repo}$, the linear reposition point 66 on the tape is known, it remains to determine the optimum motion profile to rewind the tape from the stop point 62 to the reposition point 66. The optimum motion profile accomplishes repositioning in the minimum time within the limitations of power available, maximum acceleration of the tape and maximum tape speed. This calculation is accomplished as follows, with reference to FIG. 10.

Optimum Motion Profile Calculation

Figure 10:
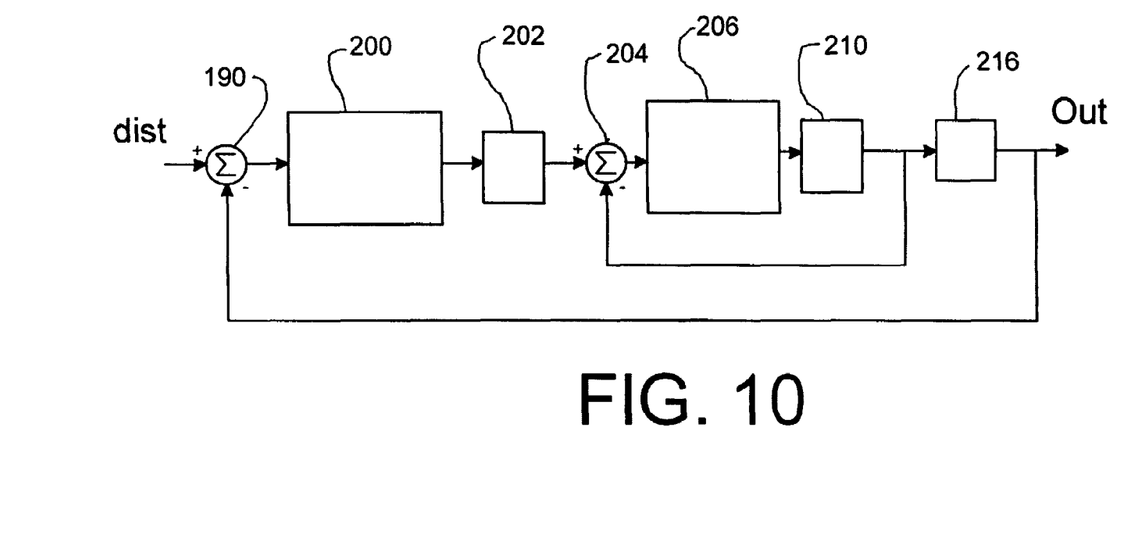
FIG. 10 is a block diagram illustrating a calculation according to an embodiment of the present invention.

The following variables are initialized:
Out=0
Dist=$LPOS_{repo}$
Vel=0
Ts=sample time constant
velmax=a predetermined value which is the maximum velocity of the particular tape in a particular tape drive, which is determined experimentally or known for a particular class of drives.
accmax=a predetermined value which is the maximum acceleration of the particular tape in a particular tape drive, which is determined experimentally or known for a particular class of drives.

Then the following calculations of steps 200–216 are repeated until poserr=zero, where poserr=Dist-Out.

In Step 190 calculate poserr

Where poserr=Dist-Out.

In step 200 calculate velref

Where $velref = 2\sqrt{2*|poserr|*accmax}$

Then in step 202 limit velref to a value between +velmax and -velmax.

Then in step 204 calculate temp

Where temp=velref-Vel

Then in step 206 set temp according to a deadband by
if temp>deadband
set temp1=Kp
else if temp<-deadband
set temp1=-Kp Then in step 210 integrate the variable temp1 to determine Vel:

Where $Vel_{n+1}$=temp1*Ts+$Vel_n$

Where $Vel_{n+1}$ refers to Vel determined in the n+1 iteration

Then in step 216 integrate the variable Vel to determine Out:

$Out_{n+1}$=Vel*Ts+$Out_n$

Where $Out_{n+1}$ refers to Out determined in the n+1 iteration

When poserr reaches ZERO, the computation ends. At this point an optimum Velocity Profile (a set of Velocity values that starts at zero, reaches to some value, then ramps down to zero ending the motion) has been generated that will result in the tape to be repositioned by the LPOSrepo amount with minimum time and limited by the power, acceleration values as we have dictated. The actual motion is the velocity control of the reel to reel tape using this actual generated Velocity Profile data. If this is done with velocity servo control with the profile data being the reference to the servo loop, the tape will move back the predetermined LPOSrepo amount in a minimum time therefore satisfying the overall under run motion requirements.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of operating a system comprising a host computer, a buffer, a tape drive and a tape, the method comprising:
    writing data to the tape while the tape is traveling at a first speed;
    stopping the tape;
    determining an optimum minimum distance to reposition the tape, using iterative logic;
    repositioning the tape at the determined optimum minimum distance; and,
    thereafter driving the tape to travel at the second speed while writing data to the tape.

2. A method according to claim 1 further comprising a step of ceasing writing to the tape at a first location on the tape.

3. A method according to claim 2 wherein the step of determining an optimum minimum distance to reposition the tape comprises consideration of the first location on the tape.

4. A method according to claim 1 wherein the tape is stopped after the buffer is empty.

5. A method according to claim 1 further comprising the step of determining an optimum velocity, using iterative logic, at which to reposition the tape.

6. A method according to claim 1 wherein the step of determining an optimum minimum distance to reposition the tape includes consideration of properties of the tape drive and tape.

7. A method according to claim 6 wherein properties of the tape drive and tape which are considered include maximum acceleration and maximum deceleration limitations of the tape drive and tape.

8. A method according to claim 6 wherein properties of the tape drive and tape which are considered include maximum velocity limitations of the tape drive and tape.

9. A method according to claim 1 wherein the step of determining an optimum minimum distance to reposition the tape further comprises
iteratively determining a velocity reference variable, wherein the velocity reference variable changes with each calculation, through steps which include an integration of an acceleration variable, wherein the acceleration variable also changes with each calculation, and
integrating the velocity reference variable between an initial time and a final calculation.

10. A method according to claim 5 wherein the step of determining an optimum velocity further comprises using the optimum minimum distance in an iterative determination of a velocity profile, through steps which include an integration of a velocity variable, wherein the velocity variable changes with each calculation.

11. A method of operating a system comprising a host computer, a buffer, a tape drive and a tape, the method comprising:
writing data to the tape while the tape is traveling at a first speed;
stopping the tape;
determining a second speed at which to drive the tape to travel;
determining an optimum minimum distance to reposition the tape, using iterative logic, based on factors including a determined second speed;
repositioning the tape at the determined optimum minimum distance; and,
thereafter driving the tape to travel at the second speed while writing data to the tape.

12. A method according to claim 11 wherein the factors upon which the determination of the distance to reposition the tape include characteristics of the tape drive and tape.

13. A method according to claim 12 wherein the factors upon which the determination of the optimum minimum distance to reposition the tape include maximum acceleration and maximum deceleration limitations of the tape drive and tape.

14. A method according to claim 12 wherein the factors upon which the determination of the optimum minimum distance to reposition the tape include maximum velocity limitations of the tape drive and tape.

15. A method according to claim 11 further comprising the step of determining an optimum velocity, using iterative logic, at which to reposition the tape.

16. A method according to claim 11 wherein the step of determining an optimum minimum distance to reposition the tape further comprises
iteratively determining a velocity reference variable, wherein the velocity reference variable changes with each calculation, through steps which include an integration of an acceleration variable, wherein the acceleration variable also changes with each calculation, and
integrating the velocity reference variable between an initial time and a final calculation.

17. A method according to claim 15, wherein the step of determining an optimum velocity further comprises using the optimum minimum distance in an iterative determination of a velocity profile, through steps which include an integration of a velocity variable, wherein the velocity variable changes with each calculation.

18. A control system for controlling a tape drive system comprising a host computer, a buffer, a tape drive and a tape, the control system comprising:
tape drive control means to control the tape drive to drive the tape to travel at a first speed and a second speed while data is written to the tape and to stop the tape between travel at the first speed and at the second speed; and,
reposition determination means for determining an optimum minimum distance to reposition the tape, using iterative logic, said reposition determination means being coupled to said tape drive control means.

19. A control system according to claim 18 wherein the tape drive system includes writing means to write to the tape and said control system further comprises writing control means to control the writing means to cease writing to the tape at a first location on the tape.

20. A control system according to claim 18 wherein said reposition determination means utilizes the first location on the tape.

21. A control system according to claim 18 wherein said control system is constructed to stop said tape when said buffer is empty.

22. A control system according to claim 18 wherein said reposition determination means determines an optimum velocity, using iterative logic, at which to reposition the tape.

23. A control system according to claim 18 wherein said reposition determination means utilizes properties of the tape drive and tape.

24. A control system according to claim 23 wherein said reposition determination means considers maximum acceleration and maximum deceleration limitations of the tape drive and tape.

25. A control system according to claim 18 wherein said reposition determination means further comprises
an iterative determination of a velocity reference variable, wherein the velocity reference variable changes with each calculation, through steps which include an integration of an acceleration variable, wherein the acceleration variable also changes with each calculation, and
integration of the velocity reference variable between an initial time and a final calculation.

26. A control system according to claim 22 wherein the reposition determination means determines an optimum velocity using the optimum minimum distance in an iterative determination of a velocity profile, through steps which include an integration of a velocity variable, wherein the velocity variable changes with each calculation.

* * * * *

UNITED STATES PATENT AND TRADEMARK OFFICE
CERTIFICATE OF CORRECTION

| | |
|---|---|
| PATENT NO. | : 7,190,544 B2 |
| APPLICATION NO. | : 10/985624 |
| DATED | : March 13, 2007 |
| INVENTOR(S) | : Turguy Goker and Kempton W. Redhead |

It is certified that error appears in the above-identified patent and that said Letters Patent is hereby corrected as shown below:

Column 9, line 51, change "detennining" to --determining--

Signed and Sealed this

Seventh Day of August, 2007

JON W. DUDAS
*Director of the United States Patent and Trademark Office*